US 9,333,848 B2

(12) United States Patent
Ono et al.

(10) Patent No.: US 9,333,848 B2
(45) Date of Patent: May 10, 2016

(54) HYBRID VEHICLE DRIVE DEVICE

(75) Inventors: Tomohito Ono, Gotenba (JP); Yuji Iwase, Mishima (JP); Yosuke Suzuki, Susono (JP); Takahito Endo, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/378,144

(22) PCT Filed: Feb. 14, 2012

(86) PCT No.: PCT/JP2012/053393
§ 371 (c)(1),
(2), (4) Date: Aug. 12, 2014

(87) PCT Pub. No.: WO2013/121526
PCT Pub. Date: Aug. 22, 2013

(65) Prior Publication Data
US 2014/0371017 A1 Dec. 18, 2014

(51) Int. Cl.
*B60K 6/365* (2007.10)
*B60K 6/547* (2007.10)
*B60K 6/445* (2007.10)
*B60K 6/387* (2007.10)
*B60K 6/383* (2007.10)
*B60K 6/38* (2007.10)
*F16H 37/10* (2006.01)

(52) U.S. Cl.
CPC ............... *B60K 6/547* (2013.01); *B60K 6/365* (2013.01); *B60K 6/383* (2013.01); *B60K 6/387* (2013.01); *B60K 6/445* (2013.01); *B60K 2006/381* (2013.01); *F16H 2037/102* (2013.01); *F16H 2200/2007* (2013.01); *Y02T 10/6239* (2013.01); *Y10S 903/902* (2013.01)

(58) Field of Classification Search
None
See application file for complete search history.

(56) References Cited

U.S. PATENT DOCUMENTS

| 6,478,705 | B1 | 11/2002 | Holmes et al. | |
|---|---|---|---|---|
| 8,475,312 | B2 * | 7/2013 | Park et al. | 475/5 |
| 2008/0053723 | A1 | 3/2008 | Kozarekar | |
| 2008/0125264 | A1 * | 5/2008 | Conlon et al. | 475/5 |
| 2011/0300982 | A1 * | 12/2011 | Park et al. | 475/5 |
| 2011/0312461 | A1 * | 12/2011 | Park | 475/5 |
| 2012/0322601 | A1 * | 12/2012 | Kim et al. | 475/5 |

FOREIGN PATENT DOCUMENTS

| EP | 1707416 A1 | 10/2006 |
|---|---|---|
| JP | 2005-081929 A | 3/2005 |
| JP | 2007-314088 A | 12/2007 |
| JP | 2009-173282 A | 8/2009 |
| JP | 2009-248914 A | 10/2009 |
| JP | 2005-081929 A | 7/2010 |

* cited by examiner

Primary Examiner — Justin Holmes
(74) Attorney, Agent, or Firm — Kenyon & Kenyon LLP

(57) ABSTRACT

A hybrid vehicle drive unit including a first planetary gear mechanism; a second planetary gear mechanism; a clutch; and a brake, wherein a first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels, a first rotating element of the second planetary gear mechanism is connected to the engine and the first ring gear via the clutch, and a third rotating element is connected to a second rotating electric machine, the first rotating element is a sun gear of the second planetary gear mechanism, and the brake regulates a rotation of the first rotating element.

5 Claims, 6 Drawing Sheets

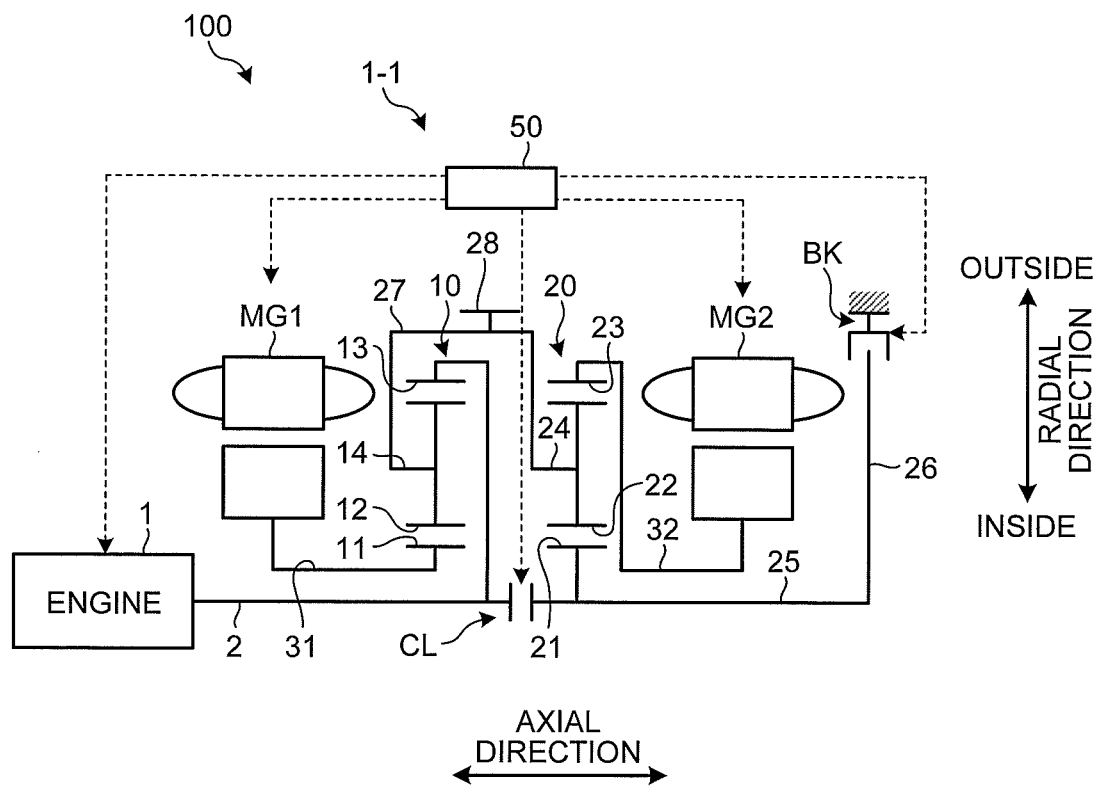

S1     R2       C1, C2    R1, S2
MG1    MG2      OUT       ENGINE
                          (BK)

HYBRID VEHICLE DRIVE DEVICE

CROSS-REFERENCE TO RELATED APPLICATIONS

This is a national phase application based on the PCT International Patent Application No. PCT/JP2012/053393 filed Feb. 14, 2012, the entire contents of which are incorporated herein by reference.

FIELD

The present invention relates to a hybrid vehicle drive device.

BACKGROUND

In the related art, there have been proposed hybrid vehicle drive devices each having plural travel modes. For example, Patent Literature 1 discloses a technology of a hybrid drive device provided with a mode switch mechanism that changes a positional relation of a prime mover, a first motor/generator, a second motor/generator, an output element, and a reaction force element on an alignment chart.

CITATION LIST

Patent Literature

Patent Literature 1: Japanese Patent Application Laid-open No. 2007-314088

SUMMARY

Technical Problem

It has been desired to be able to simplify a configuration of a hybrid vehicle drive device having plural travel modes. For example, it is desirable to be able to realize plural EV travel modes and plural HV travel modes by a hybrid vehicle drive device having a simple configuration.

An object of the present invention is to provide a hybrid vehicle drive device capable of realizing plural travel modes by a simple configuration.

Solution to Problem

A hybrid vehicle drive device according to the present invention includes a first planetary gear mechanism; a second planetary gear mechanism; a clutch; and a brake, wherein, a first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels, a first rotating element of the second planetary gear mechanism is connected to the engine and the first ring gear via the clutch, and a third rotating element is connected to a second rotating electric machine, the first rotating element is a sun gear of the second planetary gear mechanism, and the brake regulates a rotation of the first rotating element.

In the hybrid vehicle drive device, it is preferable that an alignment sequence of the respective rotating elements of the first planetary gear mechanism and the second planetary gear mechanism in an alignment chart at the time the clutch is in engagement is a sequence of the first sun gear, the third rotating element, the first carrier and the second rotating element, and the first ring gear and the first rotating element, or a sequence of the third rotating element, the first sun gear, the first carrier and the second rotating element, and the first ring gear and the first rotating element.

In the hybrid vehicle drive device, it is preferable that the clutch and the brake are a meshing type engaging device.

In the hybrid vehicle drive device, it is preferable that the hybrid vehicle drive device further includes a one way clutch configured to regulate the rotation of the first rotating element.

In the hybrid vehicle drive device, it is preferable that the second planetary gear mechanism is of a single pinion type, and the second rotating element is a carrier of the second planetary gear mechanism, and the third rotating element is a ring gear of the second planetary gear mechanism.

In the hybrid vehicle drive device, it is preferable that the second planetary gear mechanism is of a double pinion type, and the second rotating element is a ring gear of the second planetary gear mechanism, and the third rotating element is a carrier of the second planetary gear mechanism.

Advantageous Effects of Invention

A hybrid vehicle drive device according to the present invention includes a first planetary gear mechanism, a second planetary gear mechanism, a clutch, and a brake. A first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels. A first rotating element of the second planetary gear mechanism is connected to the engine and the first ring gear via the clutch, and a third rotating element is connected to a second rotating electric machine. The first rotating element is a sun gear. The brake regulates a rotation of the first rotating element. According to the hybrid vehicle drive device of the present invention, such an effect that plural travel modes can be realized by a simple configuration can be achieved.

BRIEF DESCRIPTION OF DRAWINGS

FIG. 1 is a main portion skeleton view of a vehicle according to an embodiment.

FIG. 2 is a view illustrating an engagement table of a hybrid vehicle drive device according to the embodiment.

DESCRIPTION OF EMBODIMENTS

Figure 3:
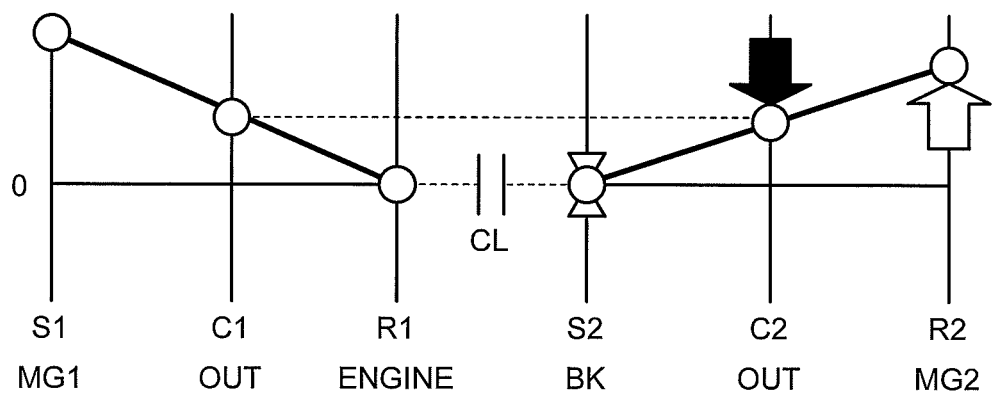
FIG. 3 is an alignment chart according to an EV-1 mode.

A hybrid vehicle drive device according to an embodiment of the present invention will be explained below in detail with reference to the drawings. Note that the present invention is not limited by the embodiment. Further, components of the following embodiment include components that can be easily envisaged by a person skilled in the art or substantially the same components.

Embodiment

An embodiment will be explained with reference to FIG. 1 to FIG. 8. The present embodiment relates to a hybrid vehicle drive device. FIG. 1 is a main portion skeleton view of a vehicle 100 according to an embodiment of the present invention, and FIG. 2 is a view illustrating an engagement table of a hybrid vehicle drive device 1-1 according to the embodiment.

The hybrid vehicle drive device 1-1 according to the present embodiment is a hybrid system having two planetary gears, two motors, and plural engaging devices and has an electric torque converter mode and a composite split mode in which a four-element planetary is sequentially coupled in a sequence of MG1-MG2-output-engine on an alignment chart. The hybrid vehicle drive device 1-1 has a brake and a clutch as the engaging devices and can realize at least two modes at the time of hybrid and two modes having the different number of MGs to be driven at the time of EV by engagement/disengagement thereof. Further, the hybrid vehicle drive device 1-1 has two mechanical points on a low gear side, and thus high transmission efficiency can be expected.

The vehicle 100 illustrated in FIG. 1 is configured including an engine 1, a first planetary gear mechanism 10, a second planetary gear mechanism 20, a first rotating electric machine MG1, a second rotating electric machine MG2, a clutch CL, a brake BK, and an ECU 50. Further, the hybrid vehicle drive device 1-1 according to the present embodiment is configured including the first planetary gear mechanism 10, the second planetary gear mechanism 20, the clutch CL, and the brake BK. The hybrid vehicle drive device 1-1 may be configured further including the ECU 50.

The engine 1, which is an example of an engine, outputs combustion energy of fuel by converting the energy to a rotating motion of a rotating shaft. The rotating shaft of the engine 1 is connected with an input shaft 2. The input shaft 2 is an input shaft of the first planetary gear mechanism 10 and disposed coaxially with the rotating shaft of the engine 1. Torque of the engine 1 is input to the first planetary gear mechanism 10 via the input shaft 2.

The first planetary gear mechanism 10 is an example of a first differential mechanism. The first planetary gear mechanism 10 is of a single pinion type and has a first sun gear 11, a first pinion gear 12, a first ring gear 13, and a first carrier 14.

The first ring gear 13 is disposed coaxially with the first sun gear 11 and externally in a radial direction of the first sun gear 11. The first pinion gear 12 is disposed between the first sun gear 11 and the first ring gear 13 and is in mesh with the first sun gear 11 and the first ring gear 13, respectively. The first pinion gear 12 is rotatably supported by the first carrier 14.

A rotating shaft 31 of the first rotating electric machine MG1 is disposed coaxially with the input shaft 2 and externally in the radial direction of the input shaft 2. The first sun gear 11 is connected with the rotating shaft 31. Namely, the first sun gear 11 is rotatably supported coaxially with the input shaft 2 and is connected with the first rotating electric machine MG1. The first ring gear 13 is connected with the input shaft 2 and rotates integrally with the input shaft 2. Namely, the first ring gear 13 is connected to the engine 1 and can rotate integrally with the engine 1. The first carrier 14 is connected with a second carrier 24 via a cylindrical member 27. The cylindrical member 27 is formed in a cylindrical shape and disposed externally in the radial direction of the first planetary gear mechanism 10.

The second planetary gear mechanism 20 is an example of a second differential mechanism. The second planetary gear mechanism 20 is of a single pinion type and has a second sun gear 21, a second pinion gear 22, a second ring gear 23, and the second carrier 24. In the present embodiment, the second sun gear 21 corresponds to a first rotating element, the second carrier 24 corresponds to a second rotating element, and the second ring gear 23 corresponds to a third rotating element.

The second ring gear 23 is disposed coaxially with the second sun gear 21 and externally in the radial direction of the second sun gear 21. The second pinion gear 22 is disposed between the second sun gear 21 and the second ring gear 23 and is in mesh with the second sun gear 21 and the second ring gear 23, respectively. The second pinion gear 22 is rotatably supported by the second carrier 24.

A rotating shaft 25 of the second sun gear 21 is disposed coaxially with the input shaft 2 on an extended line of the input shaft 2. The rotating shaft 25 is rotatably supported. The second ring gear 23 is connected with a rotating shaft 32 of the second rotating electric machine MG2. The rotating shaft 32 of the second rotating electric machine MG2 is disposed coaxially with the rotating shaft 25 of the second sun gear 21 and externally in the radial direction of the rotating shaft 25. The first carrier 14, the second carrier 24, and the cylindrical member 27 are rotatably supported coaxially with the input shaft 2. The first pinion gear 12 can make revolution around (revolve around) a center axis line of the input shaft 2 together with the first carrier 14 and can make revolution on a center axis line of the first pinion gear 12 (revolve on its axis line) while being supported by the first carrier 14. The second pinion gear 22 can rotate around (revolve around) a center axis line of the rotating shaft 25 together with the second carrier 24 and can make revolution on a center axis line of the second pinion gear 22 (revolve on its axis line) while being supported by the second carrier 24.

Counter drive gear 28 are disposed on an outer peripheral surface of the cylindrical member 27. The counter drive gear 28 are connected with driving wheels via a gear mechanism including a differential device and a speed reducer and a drive shaft. The counter drive gear 28 are output gears disposed in output shafts of the planetary gear mechanisms 10, 20 and output torque that is output from the first planetary gear mechanism 10 and the second planetary gear mechanism 20 to the driving wheels. The first carrier 14 and the second carrier 24 are connected with the driving wheels via the counter drive gear 28, the gear mechanism, and the drive shaft.

The clutch CL is a clutch device capable of coupling the input shaft 2 and the rotating shaft 25. The second sun gear 21 is connected to the engine 1 and the first ring gear 13 via the clutch CL. Although the clutch CL may be configured as, for example, a friction engagement clutch, the clutch CL is not limited thereto and a known clutch device such as a mesh clutch, etc. may be used as the clutch CL. When a mesh dog clutch, etc. are used as the clutch CL, a dragging loss in a release state is suppressed. The clutch CL is caused to engage or is released by being driven by an actuator operated by, for example, hydraulic pressure, an electromagnetic force, etc. When the electromagnetic actuator is used, since a hydraulic pressure circuit becomes unnecessary, simplification and weight reduction of a transaxle becomes possible.

The clutch CL in a perfectly engagement state couples the input shaft 2 and the rotating shaft 25 and can rotate the input shaft 2 and the rotating shaft 25 integrally. Namely, the clutch CL in the perfectly engagement state regulates a relative rotation between the engine 1 and the first ring gear 13, and the second sun gear 21. In contrast, the clutch CL in a release state separates the input shaft 2 from the rotating shaft 25 and allows a relative rotation between the input shaft 2 and the rotating shaft 25. Namely, the clutch CL in the release state allows the relative rotation between the engine 1 and the first ring gear 13, and the second sun gear 21. Note that the clutch CL can be controlled to a semiengagement state.

The brake BK is a brake device capable of regulating a rotation of the second sun gear 21 by engagement therewith. The brake BK has an engaging element disposed in a disk member 26 and an engaging element connected with a vehicle body side, for example, a case that accommodates the rotating electric machines MG1, MG2 and the planetary gear mechanisms 10, 20, etc. The disk member 26 is a disk shaped member projecting externally in the radial direction from the rotating shaft 25 of the second sun gear 21. Although the brake BK may be configured as a friction engagement clutch device similar to the clutch CL, the brake BK is not limited thereto, and a mesh clutch, for example, a known clutch device such as a dog clutch may be used as the brake BK. The brake BK is caused to engage or is released by being driven by an actuator operated by, for example, hydraulic pressure, an electromagnetic force, etc.

The brake BK in the perfectly engagement state couples the second sun gear 21 and the vehicle body side, and can regulate the rotation of the second sun gear 21. In contrast, the brake BK in the release state separates the second sun gear 21 from the vehicle body side and allows the rotation of the second sun gear 21. Note that the brake BK can be controlled to the semiengagement state.

The first rotating electric machine MG1, the first planetary gear mechanism 10, the counter drive gear 28, the clutch CL, the second planetary gear mechanism 20, the second rotating electric machine MG2, and the brake BK are disposed coaxially with the rotating shaft of the engine 1 sequentially from a side close to the engine 1.

The first rotating electric machine MG1 and the second rotating electric machine MG2 have a function as a motor (electric motor) and a function as a generator, respectively. The first rotating electric machine MG1 and the second rotating electric machine MG2 are connected with a battery via an inverter. The first rotating electric machine MG1 and the second rotating electric machine MG2 can output electric power supplied from the battery by converting the electric power to mechanical power and can convert mechanical power to electric power by being driven by power to be input. The electric power generated by the rotating electric machines MG1, MG2 can be stored in the battery. An AC synchronous motor generator, for example, may be used as the first rotating electric machine MG1 and the second rotating electric machine MG2.

In the present embodiment, the ECU 50 causes the first rotating electric machine MG1 to function mainly as a rotating electric machine that receives a reaction force of the engine 1 and causes the second rotating electric machine MG2 to mainly function as a traveling driving rotating electric machine. Note that the ECU 50 is not limited thereto and may cause the first rotating electric machine MG1 to function mainly as the traveling driving rotating electric machine and cause the second rotating electric machine MG2 to function mainly as the rotating electric machine for receiving the reaction force.

The vehicle 100 includes the ECU 50. The ECU 50 is an electronic control unit having a computer. The ECU 50 has a function as a controller that controls respective units of the vehicle 100. The ECU 50 is connected with the engine 1, the first rotating electric machine MG1, the second rotating electric machine MG2, the clutch CL, and the brake BK and can control the engine 1, the first rotating electric machine MG1, the second rotating electric machine MG2, the clutch CL, and the brake BK.

For example, the ECU 50 can control torque and RPM of the engine 1 by a fuel injection control, an ignition control and an electronic throttle control of the engine 1, etc. Further, the ECU 50 can control RPM and torque of the first rotating electric machine MG1 and the second rotating electric machine MG2. Further, the ECU 50 can control an engagement/release state of the clutch CL and the brake BK by controlling hydraulic pressure supplied from a hydraulic pressure controller (not illustrated) to the clutch CL and the brake BK.

To the ECU 50 are connected sensors that detect a vehicle speed, an accelerator opening degree, RPM of the first rotating electric machine MG1 (hereinafter, simply described also as "MG1 RPM"), RPM of the second rotating electric machine MG2 (hereinafter, simply described also as "MG2 RPM"), RPM of the output shafts, a battery state, etc. The ECU 50 can calculate an output requested to the vehicle 100 based on the information obtained from the respective sensors and control the engine 1, the rotating electric machines MG1, MG2, the clutch CL, the brake BK, etc.

FIG. 2 is a view illustrating an operation engagement table of the hybrid vehicle drive device 1-1 according to the present embodiment. In the engagement table of FIG. 2, circular symbols of the columns of the brake BK and columns of the clutch CL indicate engagement, and blank columns thereof indicate release. In the vehicle 100, a hybrid (HV) travel or an EV travel can be selectively executed. The HV travel is a travel mode that causes the vehicle 100 to travel using the engine 1 as a power source. In the HV travel, at least any one of the first rotating electric machine MG1 and the second rotating electric machine MG2 can be used as the power source in addition to the engine 1.

The EV travel is a travel mode in which a travel is carried out by using at least any one of the first rotating electric machine MG1 and the second rotating electric machine MG2 as the power source. In the EV travel, it is possible to travel while stopping the engine 1. The hybrid vehicle drive device 1-1 according to the present embodiment has an EV-1 mode and an EV-2 mode as an EV travel mode. The EV-1 mode is a single motor EV mode that causes the vehicle 100 to travel using the second rotating electric machine MG2 as a single power source. The EV-2 mode is a both motor EV mode that can cause the vehicle 100 to travel using the first rotating electric machine MG1 and the second rotating electric machine MG2 as the power source.

EV-1 Mode

FIG. 3 is an alignment chart according to the EV-1 mode. In respective alignment charts, signs S1, C1, R1 indicate the first sun gear 11, the first carrier 14, and the first ring gear 13, respectively. Further, signs S2, C2, R2 indicate the second sun gear 21, the second carrier 24, and the second ring gear 23, respectively. In the EV-1 mode, the ECU 50 causes the brake BK to engage and releases the clutch CL.

The rotation of the second sun gear 21 is regulated by the brake BK in the engagement state. Further, the engine 1 and the first ring gear 13 can rotate relatively with respect to the second sun gear 21 by the clutch CL in the release state. The first carrier 14 that is an output element of the first planetary gear mechanism 10 and the second carrier 24 that is an output element of the second planetary gear mechanism 20 are coupled to each other and rotate at the same RPM. In the EV-1 mode, the ECU 50 causes the vehicle 100 to travel using the second rotating electric machine MG2 as the power source. The second sun gear 21 whose rotation has been regulated functions as a reaction force receiver to torque of the second rotating electric machine MG2 (hereinafter, simply described also as "MG2 torque") and can cause the MG2 torque to be output from the second carrier 24. When the brake BK is in the engagement state, the second planetary gear mechanism 20 reduces a speed of a rotation of the second rotating electric machine MG2 and outputs the rotation from the second carrier 24. Namely, the second planetary gear mechanism 20 can output the MG2 torque after having amplified the MG2 torque.

In the present embodiment, since the brake BK regulates the rotation of the second sun gear 21, a speed reduction ratio at which the second planetary gear mechanism 20 reduces a speed of the rotation of the second rotating electric machine MG2 becomes relatively small. When a speed of a rotation is reduced between other rotating elements by regulating any rotation of the second sun gear 21, the second carrier 24, and the second ring gear 23, a degree of speed reduction in a case of fixing the second sun gear 21 is smallest and a degree of speed reduction in a case of fixing the second ring gear 23 becomes largest. Thus, in the hybrid vehicle drive device 1-1 according to the present embodiment, the RPM of the second rotating electric machine MG2 can be suppressed to a low rotation and a loss of gears and bearings can be reduced.

The second rotating electric machine MG2 outputs positive torque and rotates positively so that the second rotating electric machine MG2 can cause positive torque to be output from the second carrier 24 and generate a driving force in a forward travel direction in the vehicle 100. Further, the second rotating electric machine MG2 outputs negative torque and rotates negatively so that the second rotating electric machine MG2 can cause negative torque to be output from the second carrier 24 and generate a driving force in a backward travel direction in the vehicle 100. Note that the positive rotation means rotation directions of the first carrier 14 and the second carrier 24 at the time of forward travel of the vehicle 100, and the positive torque indicates torque in a positive rotation direction. In the EV-1 mode, for example, the first ring gear 13 connected with the engine 1 stops a rotation and the first sun gear 11 rotates idly. In the EV-1 mode, it is also possible to generate a brake force by generating regenerative power by the second rotating electric machine MG2.

EV-2 Mode

Figure 4:
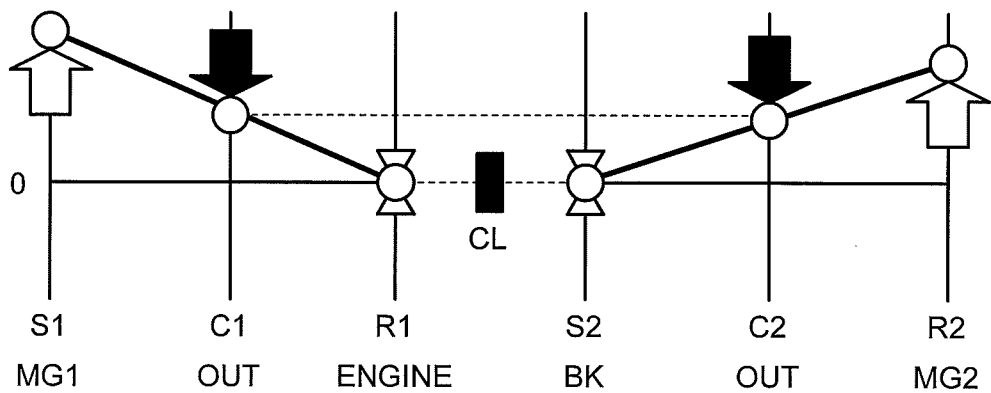
FIG. 4 is an alignment chart according to an EV-2 mode.

FIG. 4 is an alignment chart according to the EV-2 mode. In the EV-2 mode, the ECU 50 causes the brake BK and the clutch CL to engage, respectively. A relative rotation between the engine 1 and the first ring gear 13 and the second sun gear 21 is regulated by the clutch CL in the engagement state. Further, the rotation of the second sun gear 21 is regulated by the brake BK in the engagement state. Accordingly, in the EV-2 mode, rotations of the engine 1, the first ring gear 13, and the second sun gear 21 are regulated.

The first ring gear 13 whose rotation has been regulated functions as a reaction force receiver to torque of the first rotating electric machine MG1 (hereinafter, simply described also as "MG1 torque") and can cause the MG1 torque to be output from the first carrier 14. The first rotating electric machine MG1 outputs positive torque and rotates positively so that the first rotating electric machine MG1 can cause positive torque to be output from the first carrier 14 and generate a driving force in the forward travel direction in the vehicle 100. Further, the first rotating electric machine MG1 outputs negative torque and rotates negatively so that the first rotating electric machine MG1 can cause negative torque to be output from the first carrier 14 and generate a driving force in the backward travel direction in the vehicle 100.

The second sun gear 21 whose rotation has been regulated functions as a reaction force receiver to the MG2 torque and can cause the MG2 torque to be output from the second carrier 24. The second rotating electric machine MG2 outputs positive torque and rotates positively so that the second rotating electric machine MG2 can cause positive torque to be output from the second carrier 24 and generate a driving force in the forward travel direction in the vehicle 100. Further, the second rotating electric machine MG2 outputs negative torque and rotates negatively so that the second rotating electric machine MG2 can cause negative torque to be output from the second carrier 24 and generate a driving force in the backward travel direction in the vehicle 100.

Namely, in the EV-2 mode, the vehicle 100 can be caused to travel by generating a travel driving force by at least any one of the first rotating electric machine MG1 and the second rotating electric machine MG2. For example, in the EV-2 mode, the first rotating electric machine MG1 and the second rotating electric machine MG2 are used as the power source and MG1 torque and the MG2 torque are output from the counter drive gear 28 to the driving wheels, respectively, and thus it is possible to drive the vehicle 100 to travel. Further, in the EV-2 mode, at least any one of the first rotating electric machine MG1 and the second rotating electric machine MG2 can be rotated idly or generate regenerative power.

HV-1 Mode

Figure 5:
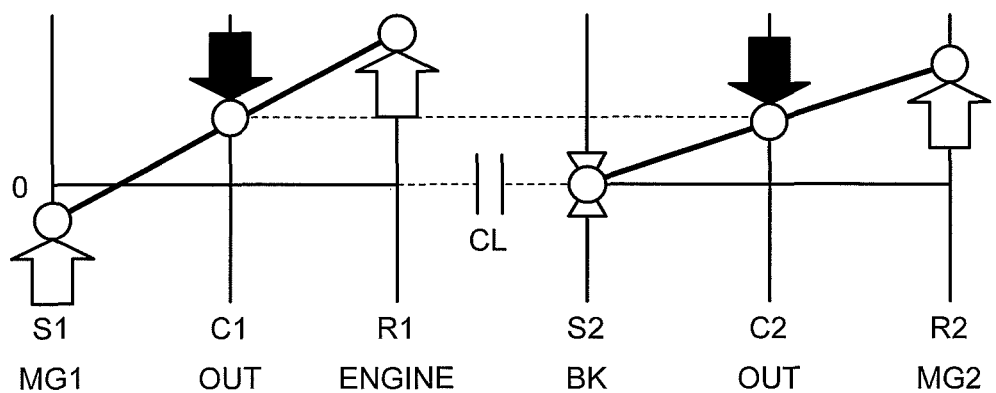
FIG. 5 is an alignment chart according to an HV-1 mode.

FIG. 5 is an alignment chart according to an HV-1 mode. In the HV-1 mode, the ECU 50 causes the brake BK to engage and releases the clutch CL. Since the brake BK is in the engagement state, the second sun gear 21 functions as a reaction force receiver to the MG2 torque and can cause the MG2 torque to be output from the second carrier 24. The ECU 50 can cause the first rotating electric machine MG1 to function as a reaction force receiver to torque of the engine 1 (hereinafter, simply described also as "engine torque") by causing the first rotating electric machine MG1 to output torque. The first rotating electric machine MG1 outputs the positive torque so that the first rotating electric machine MG1 can cause the positive torque that is output by the engine 1 to be output from the first carrier 14. When the first rotating electric machine MG1 outputs the positive torque in a negative rotation state and receives a reaction force, the first rotating electric machine MG1 can collect part of power of the engine 1 as electric power by carrying out power generation.

In the HV-1 mode, the second rotating electric machine MG2 can output assist torque that assists the engine 1 by outputting the positive torque, and carry out regenerative power generation at the time of speed reduction. In the HV-1 mode, controlling the first rotating electric machine MG1 can reduce a speed of the rotation of the engine 1 to cause the rotation to be output from the first carrier 14, and can control its degree of speed reduction. Namely, the HV-1 mode is an electric torque conversion mode capable of amplifying engine torque to cause the amplified engine torque to be output from the first carrier 14 and controlling its degree of amplification.

HV-2 Mode

Figure 6:
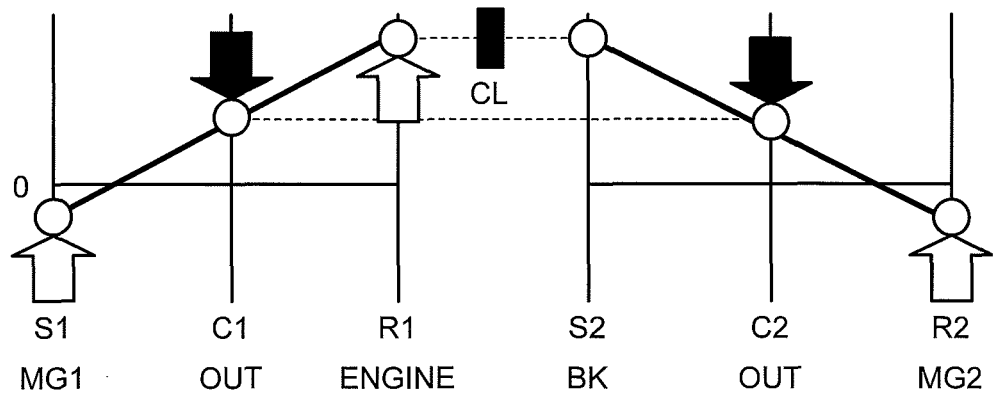
FIG. 6 is an alignment chart according to an HV-2 mode.

FIG. 6 is an alignment chart according to an HV-2 mode. In the HV-2 mode, the ECU 50 releases the brake BK and causes the clutch CL to engage. The brake BK in the release state allows the second sun gear 21 to rotate. Further, the clutch CL in the engagement state regulates the relative rotation of the first ring gear 13 and the second sun gear 21 and the first ring gear 13 and the second sun gear 21 can rotate integrally.

In the HV-2 mode, coupling the first ring gear 13 and the second sun gear 21 can cause at least any one of the first rotating electric machine MG1 and the second rotating electric machine MG2 to function as a reaction force receiver to the engine torque. For example, the first rotating electric machine MG1 can receive a reaction force of the engine torque by outputting positive torque and cause the engine torque to be output from the first carrier 14. The second rotating electric machine MG2 can receive the reaction force of the engine torque by outputting the positive torque and cause the engine torque to be output from the second carrier 24.

In this way, in the HV-2 mode, the reaction force can be received by any of the first rotating electric machine MG1 and the second rotating electric machine MG2 to the power output by the engine 1. The reaction force of the engine 1 can be received by any one or both of the first rotating electric machine MG1 and the second rotating electric machine MG2 by sharing of torque, and it becomes possible to cause the operation at efficient operation points and to relax a restriction such as a torque limitation due to heat. Thus, efficiency of the hybrid vehicle 100 can be enhanced. The HV-2 mode is a composite split mode that can divide the power of the engine 1 to an output shaft and the first rotating electric machine MG1 using the first planetary gear mechanism 10 as a power division planetary and also divide the power of the engine 1 to the other output shaft and the second rotating electric machine MG2 using the second planetary gear mechanism 20 as the power division planetary.

For example, preferentially receiving the reaction force by one that can efficiently operate of the first rotating electric machine MG1 and the second rotating electric machine MG2 can enhance efficiency. Further, when the torque limitation due to heat is imposed in any one of the rotating electric machines, a necessary reaction force can be satisfied by assisting by regeneration (or an output) of the other rotating electric machine.

Figure 7:
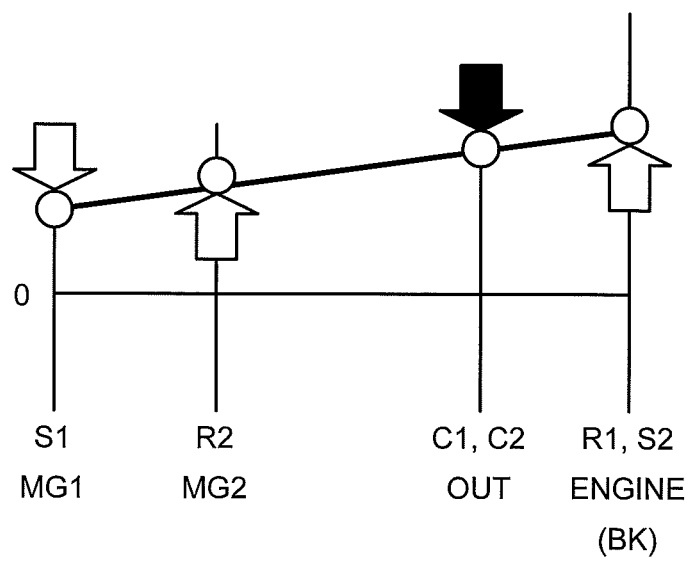
FIG. 7 is an alignment chart at the time of a four-element mode.

FIG. 7 is an alignment chart at the time of a four-element mode and is an alignment chart according to the EV-2 mode. When the clutch CL is in the engagement state, the first ring gear 13 and the second sun gear 21 are coupled and become a single rotating element. Accordingly, the first planetary gear mechanism 10 and the second planetary gear mechanism 20 function as a four-element differential mechanism in which four rotating elements of the first sun gear 11, the first carrier 14 and the second carrier 24, the first ring gear 13 and the second sun gear 21, and the second ring gear 23 rotate in association with each other.

An alignment sequence of the respective elements when rotations of the four elements are indicated in an alignment chart at the time of the clutch CL being in engagement is a sequence of the first sun gear 11 (the first rotating electric machine MG1), the second ring gear 23 (the second rotating electric machine MG2), the first carrier 14 and the second carrier 24 (outputs), and the first ring gear 13 (the engine 1) and the second sun gear 21.

Note that the first planetary gear mechanism 10 and the second planetary gear mechanism 20 may be configured so that the four elements are aligned in an alignment sequence of the second ring gear 23, the first sun gear 11, the first carrier 14 and the second carrier 24, and the first ring gear 13 and the second sun gear 21 in place of the alignment sequence of the four elements in the alignment chart of the present embodiment. Specifically, it is sufficient to determine gear ratios of the respective planetary gear mechanisms 10, 20, respectively so that an interval between an axis (R2 axis) indicating RPM of the second ring gear 23 and an axis (C2 axis) indicating RPM of the second carrier 24 in the alignment chart of FIG. 7 becomes larger than an interval between an axis (S1 axis) indicating RPM of the first sun gear 11 and an axis (C1 axis) indicating RPM of the first carrier 14.

In the present embodiment, the first planetary gear mechanism 10 and the second planetary gear mechanism 20 are of a single pinion type, respectively. Accordingly, in the alignment chart at the time of the four-element mode, a position of the axis (S1 axis) indicating the RPM of the first sun gear 11 does not overlap a position of the axis (R2 axis) indicating the RPM of the second ring gear 23. This is because, in an alignment chart of a single pinion type planetary gear mechanism, a position of an axis indicating RPM of a carrier is located closer to an axis side indicating RPM of a ring gear than an intermediate point between an axis indicating RPM of a sun gear and an axis indicating the RPM of the ring gear. Note that configuring at least any one of the first planetary gear mechanism 10 and the second planetary gear mechanism 20 as a double pinion type can also cause the axis indicating the RPM of the first sun gear 11 to overlap with the axis indicating the RPM of the second ring gear 23 (the third rotating element).

As explained below with reference to FIG. 8, the hybrid vehicle drive device 1-1 according to the present embodiment can realize a highly efficient hybrid system by having the two mechanical points in the HV-2 mode. Here, the mechanical points are mechanical transmission points and highly efficient operation points whose electric path is zero.

Figure 8:
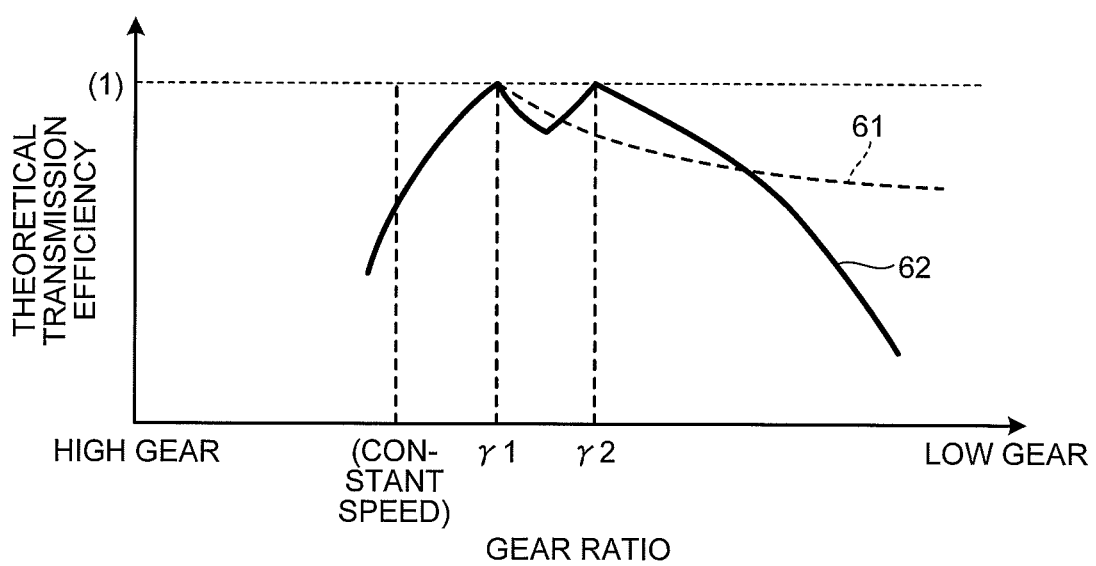
FIG. 8 is an explanatory view of theoretical transmission efficiency of the hybrid vehicle drive device according to the embodiment.

FIG. 8 is an explanatory view of theoretical transmission efficiency of the hybrid vehicle drive device 1-1 according to the present embodiment. In FIG. 8, a horizontal axis indicates a gear ratio and a vertical axis indicates the theoretical transmission efficiency. Here, the gear ratio is an ratio (speed reduction ratio) of input side RPM to output side RPMs of the first planetary gear mechanism 10 and the second planetary gear mechanism 20 and indicates, for example, a ratio of RPM of the first ring gear 13 to RPMs of the first carrier 14 and the second carrier 24. In the horizontal axis, a left side is a high gear side where the gear ratio is small, and a right side becomes the low gear side where the gear ratio is large. When power input to the planetary gear mechanisms 10, 20 is entirely transmitted to the counter drive gear 28 by the mechanical transmission without passing through the electric path, the theoretical transmission efficiency becomes maximum efficiency 1.

In FIG. 8, a broken line 61 is a transmission efficiency line at the time of the HV-1 mode, and a solid line 62 is a transmission efficiency line at the time of the HV-2 mode. The transmission efficiency line 61 at the time of the HV-1 mode becomes maximum efficiency at a gear ratio $\gamma 1$. The gear ratio $\gamma 1$ is a gear ratio at which the RPM of the first rotating electric machine MG1 (the first sun gear 11) becomes 0. Accordingly, at the gear ratio $\gamma 1$, an electric path due to the reception of a reaction force by the first rotating electric machine MG1 does not occur, and power can be transmitted from the engine 1 to the counter drive gear 28 only by the mechanical power transmission. Herein, the gear ratio $\gamma 1$ is described also as a "first mechanical transmission gear ratio $\gamma 1$". The first mechanical transmission gear ratio γ1 is a gear ratio on an under drive side, i.e., a gear ratio larger than a constant speed.

The transmission efficiency line 62 at the time of the HV-2 mode indicates transmission efficiency when the reaction force of the engine torque is appropriately received by at least any one of the first rotating electric machine MG1 and the second rotating electric machine MG2. For example, it is sufficient to cause torque to be shared by the first rotating electric machine MG1 and the second rotating electric machine MG2 so that power can be transmitted most efficiently with respect to the gear ratio.

The transmission efficiency line 62 at the time of the HV-2 mode has a mechanical point at a gear ratio γ2 in addition to the first mechanical transmission gear ratio γ1. The gear ratio γ2 is a gear ratio at which the RPM of the second rotating electric machine MG2 (the second ring gear 23) becomes 0. Accordingly, at the gear ratio γ2, an electric path due to the reception of a reaction force by the second rotating electric machine MG2 does not occur, and power can be transmitted from the engine 1 to the counter drive gear 28 only by the mechanical power transmission. Herein, this gear ratio γ2 is described also as a "second mechanical transmission gear ratio γ2".

The second mechanical transmission gear ratio γ2 is a gear ratio closer to the low gear side than the first mechanical transmission gear ratio γ1. This is because in the alignment chart illustrated in FIG. 7, the R2 axis indicating the RPM of the second ring gear 23 is located on the sides of the C1, C2 axes indicating RPMs of the carriers 14, 24 with respect to the S1 axis indicating the RPM of the first sun gear 11. A relative relation between the first mechanical transmission gear ratio γ1 and the second mechanical transmission gear ratio γ2 is determined according to a gear ratio ρ1 of the first planetary gear mechanism 10 and a gear ratio ρ2 of the second planetary gear mechanism 20. It can be assumed here that the gear ratios ρ1 and ρ2 are indicated by the following expression (1) and expression (2).

ρ1=number of teeth of first sun gear 11/number of teeth of first ring gear 13   (1)

ρ2=number of teeth of second sun gear 21/number of teeth of second ring gear 23   (2)

As the S1 axis indicating the RPM of the first sun gear 11 and the R2 axis indicating the RPM of the second ring gear 23 approach each other on the alignment chart illustrated in FIG. 7 according to the gear ratio ρ1 of the first planetary gear mechanism 10 and the gear ratio ρ2 of the second planetary gear mechanism 20, a value of the first mechanical transmission gear ratio γ1 and a value of the second mechanical transmission gear ratio γ2 become close to each other. In contrast, as the S1 axis indicating the RPM of the first sun gear 11 and the R2 axis indicating the RPM of the second ring gear 23 separate from each other on the alignment chart illustrated in FIG. 7, a difference between the first mechanical transmission gear ratio γ1 and the second mechanical transmission gear ratio γ2 increases.

As described above, the hybrid vehicle drive device 1-1 according to the present embodiment can realize two HV modes including the HV-2 mode having the two mechanical points in a low gear region and two EV modes including the EV-2 mode in which the vehicle is driven to travel by the two rotating electric machines MG1, MG2. Further, the two HV modes and the two EV modes can be realized by a simple configuration of the two planetary gear mechanisms 10, 20, the single clutch CL, and the single brake BK.

Since the hybrid vehicle drive device 1-1 according to the present embodiment has the two mechanical points on the side closer to the low gear side than the constant speed (the gear ratio 1) in the HV-2 mode, a high hybrid system having high transmission efficiency at the time of the low gear operation can be realized. Further, an interval between the first mechanical transmission gear ratio γ1 and the second mechanical transmission gear ratio γ2 can be increased. For example, the interval between the first mechanical transmission gear ratio γ1 and the second mechanical transmission gear ratio γ2 increases more than when, in the second planetary gear mechanism 20, the second ring gear 23 is used as the first rotating element, the second carrier 24 is used as the second rotating element, and the second sun gear 21 is used as the third rotating element. Thus, the transmission efficiency becomes high in a wide gear ratio range, and there is an advantage in improvement of fuel consumption.

Further, in the HV-2 mode, the reaction force of the engine 1 can be received by one or both of the rotating electric machines MG1, MG2 by sharing of torque. Thus, it becomes possible to cause the rotating electric machines MG1, MG2 to operate at efficient operation points and to relax a restriction such as a torque limitation due to heat.

Further, as the EV travel mode, the hybrid vehicle drive device 1-1 has the EV-2 mode in which the vehicle can be driven by the two rotating electric machines MG1, MG2. Thus, torque can be shared and generated (or regenerated) by one or both of the rotating electric machines MG1, MG2. As a result, it becomes possible to cause the rotating electric machines MG1, MG2 to operate at efficient operation points and to relax a restriction such as a torque limitation due to heat.

Further, in the hybrid vehicle drive device 1-1, since the first planetary gear mechanism 10 and the second planetary gear mechanism 20 are the single pinion type planetary gear mechanisms, there are a less frequency of mesh of gears and an advantage in reduction of a loss. Further, since the output shafts can be disposed in an outermost diameter, there is an advantage of easily adapting to an FF structure of a multi-axis configuration.

Further, in the hybrid vehicle drive device 1-1, since an input of maximum torque is the second ring gear 23, there is an advantage in strength of gears.

First Modification of Embodiment

Figure 9:
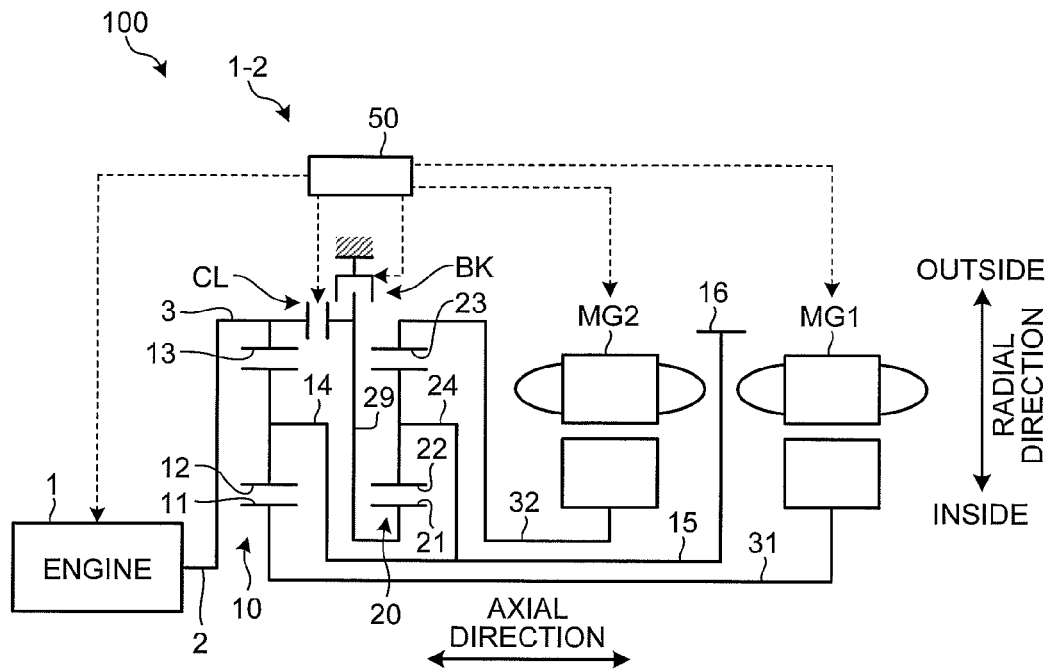
FIG. 9 is a main portion skeleton view of a vehicle according to a first modification of the embodiment.

A first modification of the embodiment will be explained. FIG. 9 is a main portion skeleton view of a vehicle according to a first modification of the embodiment. A hybrid vehicle drive device 1-2 according to the present modification is different from the hybrid vehicle drive device 1-1 of the embodiment described above in that electric parts and mechanical parts are disposed together, respectively.

As shown in FIG. 9, a first planetary gear mechanism 10, a clutch CL, a brake BK, a second planetary gear mechanism 20, a second rotating electric machine MG2, a counter drive gear 16, and a first rotating electric machine MG1 are disposed coaxially with an engine 1 from a side close to the engine 1.

A disk member 29 is connected to a rotating shaft of a second sun gear 21. The brake BK regulates a rotation of the second sun gear 21 by engagement of an engaging element disposed in the disk member 29 and an engaging element disposed on a vehicle body side. A cylindrical member 3 is connected to an input shaft 2. The cylindrical member 3 is formed in a cylindrical shape and the first planetary gear mechanism 10 is disposed therein.

The clutch CL is disposed externally in a radial direction of the first ring gear 13 in the vicinity of the brake BK. Specifically, the clutch CL is a clutch device capable of coupling the cylindrical member 3 and the disk member 29. The clutch CL connects the cylindrical member 3 and an outside end of the disk member 29 in the radial direction.

A rotating shaft 31 of the first rotating electric machine MG1 is disposed coaxially with the input shaft 2 on an extending line of the input shaft 2. A first carrier 14 and a second carrier 24 are connected with a counter drive gear 16 via a coupling shaft 15. The coupling shaft 15 is hollow and the rotating shaft 31 of the first rotating electric machine MG1 passes through a hollow portion thereof. A rotating shaft 32 of the second rotating electric machine MG2 is disposed externally in the radial direction of the coupling shaft 15.

In the hybrid vehicle drive device 1-2 according to the present modification, the electric parts such as the rotating electric machines MG1, MG2 and the mechanical parts such as the planetary gear mechanisms 10, 20, the clutch CL, and the brake BK can be disposed together, respectively. This results in an advantage in manufacture. For example, the electric parts and the mechanical parts can be assembled in different cases in different factories, respectively. Thus, a space and a weight of parts to be transported can be reduced. Further, an inspection and initial setting after assembling of the respective parts can be individually carried out at a stage of the parts. Further, it becomes unnecessary to bring the mechanical parts into a clean room used when the electric parts are mounted. As a result, a degree of rinsing can be optionally set for each part and there is such an advantage that unnecessary rinsing need not be carried out.

Second Modification of Embodiment

Figure 10:
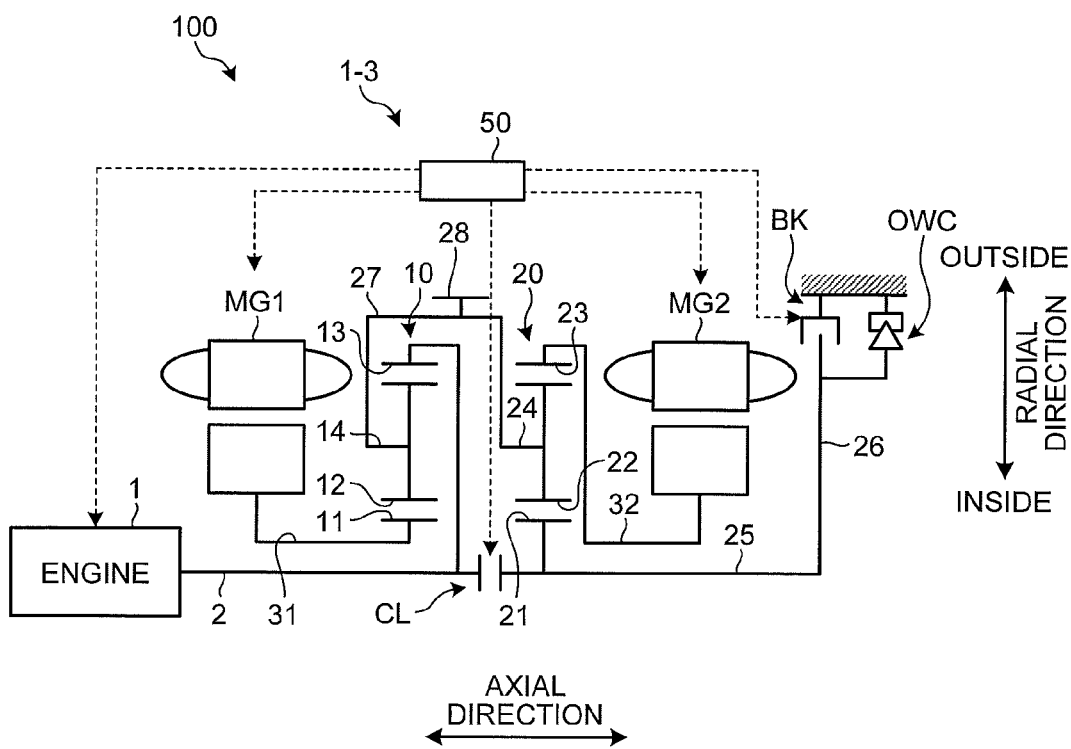
FIG. 10 is a main portion skeleton view of a vehicle according to a second modification of the embodiment.

A second modification of the embodiment will be explained. FIG. 10 is a main portion skeleton view of a vehicle according to the second modification of the embodiment. A hybrid vehicle drive device 1-3 according to the present modification is different from the hybrid vehicle drive device 1-1 of the embodiment described above in that a one way clutch OWC is provided. Engagement of a brake BK at the time of start in an EV mode can be made unnecessary by the one way clutch OWC.

The one way clutch OWC is disposed in parallel with the brake BK. The one way clutch OWC regulates a rotation of a second sun gear 21. Specifically, the one way clutch OWC allows a rotation in a positive direction of the second sun gear 21 and regulates a rotation in a negative direction thereof. The one way clutch OWC can be configured as, for example, a sprag type. An inner race of the one way clutch OWC is connected to a disk member 26 and an outer race thereof is connected to the vehicle body side. When the inner race intends to relatively rotate in the negative direction with respect to the outer race, a sprag meshes and regulates a relative rotation between the inner race and the outer race.

The one way clutch OWC can function as a reaction force receiver to MG2 torque in an EV-1 mode. At the time of start, when a second rotating electric machine MG2 outputs positive torque, negative torque acts on the second sun gear 21 and the one way clutch OWC engages. Thereby, the one way clutch OWC functions as a reaction force receiver to the MG2 torque and can cause the MG2 torque to be output from a second carrier 24.

According to the hybrid vehicle drive device 1-3 according to the present modification, at the time of start in the EV-1 mode, engagement of the brake BK becomes unnecessary. Thus, oil pump operation in a vehicle rest state, etc. becomes unnecessary, and a control is simplified while energy necessary for driving an electric oil pump is reduced at the same time.

Third Modification of Embodiment

Figure 11:
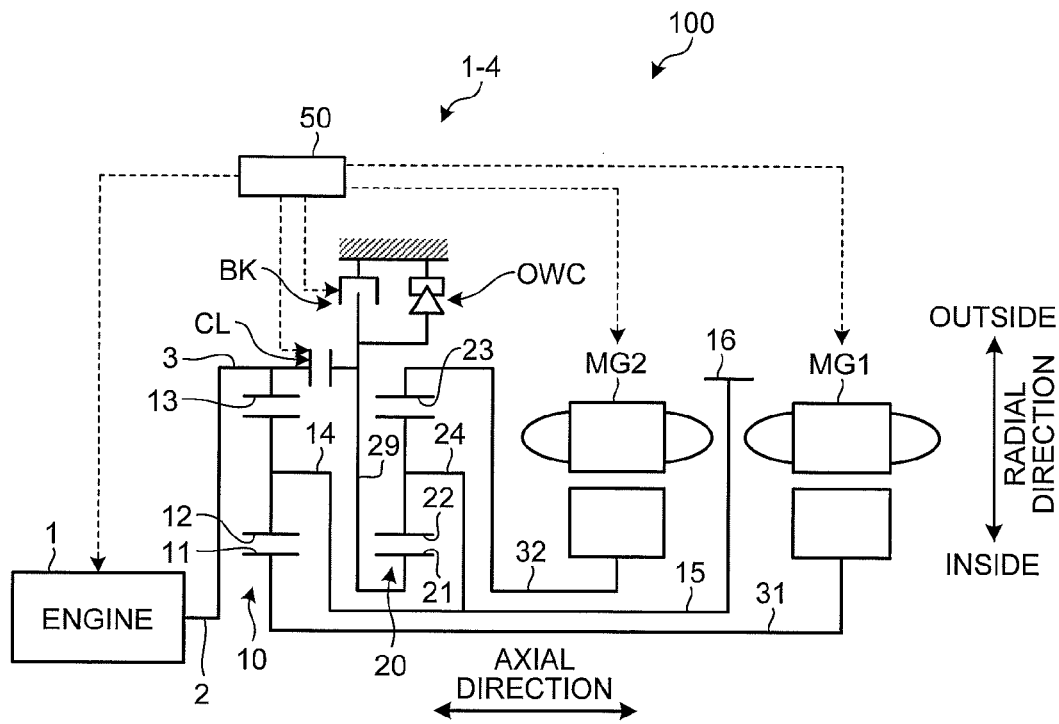
FIG. 11 is a main portion skeleton view of a vehicle according to a third modification of the embodiment.

A third modification of the embodiment will be explained. FIG. 11 is a main portion skeleton view of a vehicle according to the third modification of the embodiment. A hybrid vehicle drive device 1-4 according to the present modification is different from the hybrid vehicle drive device 1-2 of the first modification described above in that a one way clutch OWC is provided.

The one way clutch OWC is disposed in parallel with a brake BK. The one way clutch OWC regulates a rotation of a second sun gear 21. Specifically, the one way clutch OWC allows a rotation in the positive direction of the second sun gear 21 and regulates a rotation in the negative direction thereof. The one way clutch OWC can be configured as, for example, a sprag type. An inner race of the one way clutch OWC is connected to a disk member 29 and an outer race thereof is connected to a vehicle body side. When the inner race intends to relatively rotate in the negative direction with respect to the outer race, a sprag meshes and regulates the relative rotation between the inner race and the outer race.

The one way clutch OWC according to the present modification can achieve an effect similar to that of the one way clutch OWC according to the second modification described above.

Fourth Modification of Embodiment

Figure 12:
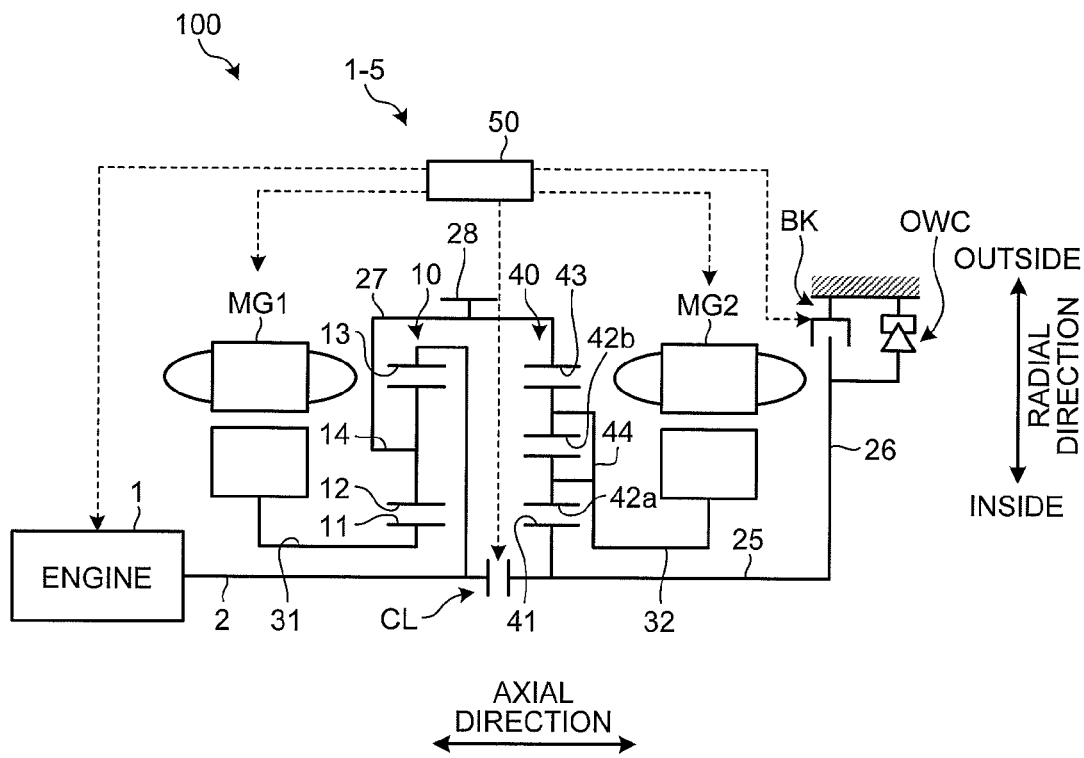
FIG. 12 is a main portion skeleton view of a vehicle according to a fourth modification of the embodiment.

A fourth modification of the embodiment will be explained. FIG. 12 is a main portion skeleton view of a vehicle according to the fourth modification of the embodiment. A hybrid vehicle drive device 1-5 according to the present modification is different from the hybrid vehicle drive device 1-3 according to the second modification of the embodiment described above in that a second planetary gear mechanism 40 is configured as a double pinion type. Note that a first planetary gear mechanism 10 may be configured as a double pinion type in place of the second planetary gear mechanism 40 or in addition to the second planetary gear mechanism 40.

The second planetary gear mechanism 40 has a second sun gear 41, an inside second pinion gear 42a, an outside second pinion gear 42b, a second ring gear 43, and a second carrier 44. The second sun gear 41 is connected to an engine 1 and a first ring gear 13 via a clutch CL. A brake BK can regulate a rotation of the second sun gear 41. A one way clutch OWC allows a positive rotation of the second sun gear 41 and regulates a negative rotation thereof.

The inside second pinion gear 42a is in mesh with the second sun gear 41 and the outside second pinion gear 42b, respectively. The outside second pinion gear 42b is in mesh with the inside second pinion gear 42a and the second ring gear 43, respectively. The inside second pinion gear 42a and the outside second pinion gear 42b are rotatably supported by the second carrier 44. The second carrier 44 is connected with a rotating shaft 32 of a second rotating electric machine MG2. The inside second pinion gear 42a and the outside second pinion gear 42b can make revolution around (revolve around) a center axis line of a rotating shaft 25 together with the second carrier 44 and can make revolution on their center axes lines (revolve on their axes) while being supported by the second carrier 44.

The second ring gear 43 is connected with a first carrier 14 via a cylindrical member 27. Specifically, in the second planetary gear mechanism 40 according to the present modification, the second sun gear 41 corresponds to a first rotating element, the second ring gear 43 corresponds to a second rotating element, and the second carrier 44 corresponds to a third rotating element.

An alignment chart at the time of a four-element mode of the hybrid vehicle drive device 1-5 according to the present modification is partly different from the alignment chart (refer to FIG. 7) at the time of the four-element mode of the hybrid vehicle drive device 1-1 according to the embodiment described above. Specifically, an axis indicating RPM of the second carrier 44 is a second axis from left and an axis indicating RPM of the second ring gear 43 is a third axis from left. Namely, an alignment sequence of respective rotating elements of the first planetary gear mechanism 10 and the second planetary gear mechanism 40 in the alignment chart at the time the clutch CL is in engagement is a sequence of a first sun gear 11, the second carrier 44, the first carrier 14, the second ring gear 43, the first ring gear 13, and the second sun gear 41.

Note that, depending on a relation between a gear ratio ρ1 of the first planetary gear mechanism 10 and a gear ratio ρ2 of the second planetary gear mechanism 40, a position of an axis indicating the RPM of the first sun gear 11 may be replaced by a position of an axis indicating RPM of the second carrier 44. That is, the alignment sequence of the respective rotating elements of the first planetary gear mechanism 10 and the second planetary gear mechanism 40 in the alignment chart at the time the clutch CL is in engagement may be a sequence of the second carrier 44, the first sun gear 11, the first carrier 14 and the second ring gear 43, and the first ring gear 13 and the second sun gear 41.

The contents disclosed in the embodiment and the respective modification described above can be executed by being appropriately combined.

REFERENCE SIGNS LIST 1-1, 1-2, 1-3, 1-4, 1-5 HYBRID VEHICLE DRIVE DEVICE
1 ENGINE
10 FIRST PLANETARY GEAR MECHANISM
11 FIRST SUN GEAR
13 FIRST RING GEAR
14 FIRST CARRIER
20, 40 SECOND PLANETARY GEAR MECHANISM
21, 41 SECOND SUN GEAR
23, 43 SECOND RING GEAR
24, 44 SECOND CARRIER
50 ECU
100 VEHICLE
BK BRAKE
CL CLUTCH
OWC ONE WAY CLUTCH
MG1 FIRST ROTATING ELECTRIC MACHINE
MG2 SECOND ROTATING ELECTRIC MACHINE

The invention claimed is:

1. A hybrid vehicle drive device comprising:
a first planetary gear mechanism;
a second planetary gear mechanism;
a clutch; and
a brake, wherein
a first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels,
a first rotating element of the second planetary gear mechanism is connected to the engine and the first ring gear via the clutch, and a third rotating element is connected to a second rotating electric machine,
the first rotating element is a sun gear of the second planetary gear mechanism,
the brake regulates a rotation of the first rotating element,
the first planetary gear mechanism and the second planetary gear mechanism include a four-element differential mechanism in which four elements of a first element that is the first ring gear, a second element that is formed by the first carrier connected to the second rotating element, a third element that is formed by the first ring gear connected to the first rotating element, and a fourth element that is the third rotating element rotate in association with each other when the clutch is in engagement and,
the four-element differential mechanism is configured such that the first element, the fourth element, the second element, and the third element are in a collinear relationship in respect of rotation speed and are in a line in a sequence of the first element, the fourth element, the second element, and the third element in an alignment chart representing the collinear relationship or that the fourth element, the first element, the second element, and the third element are in a collinear relationship in respect of rotation speed and are in a line in a sequence of the fourth element, the first element, the second element, and the third element in an alignment chart representing the collinear relationship.

2. The hybrid vehicle drive device according to claim 1, wherein
the clutch and the brake are a meshing type engaging device.

3. The hybrid vehicle drive device according to claim 1, further comprising:
a one way clutch configured to regulate the rotation of the first rotating element.

4. A hybrid vehicle drive device comprising:
a first planetary gear mechanism;
a second planetary gear mechanism;
a clutch; and
a brake, wherein
a first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels,
a first rotating element of the second planetary gear mechanism is connected to the engine and the first ring gear via the clutch, and a third rotating element is connected to a second rotating electric machine,
the first rotating element is a sun gear of the second planetary gear mechanism,
the brake regulates a rotation of the first rotating element,
the second planetary gear mechanism is of a single pinion type, and the second rotating element is a carrier of the second planetary gear mechanism, and the third rotating element is a ring gear of the second planetary gear mechanism.

5. A hybrid vehicle drive device comprising:
a first planetary gear mechanism;
a second planetary gear mechanism;
a clutch; and
a brake, wherein
a first sun gear that is a sun gear of the first planetary gear mechanism is connected to a first rotating electric machine, a first ring gear that is a ring gear of the first planetary gear mechanism is connected to an engine, and a first carrier that is a carrier of the first planetary gear mechanism is connected to a second rotating element of the second planetary gear mechanism and to driving wheels,
a first rotating element of the second planetary gear mechanism is connected to the engine and the first ring gear via the clutch, and a third rotating element is connected to a second rotating electric machine,
the first rotating element is a sun gear of the second planetary gear mechanism,
the brake regulates a rotation of the first rotating element,
the second planetary gear mechanism is of a double pinion type, and
the second rotating element is a ring gear of the second planetary gear mechanism, and the third rotating element is a carrier of the second planetary gear mechanism.

\* \* \* \* \*